United States Patent [19]
Henrie

[11] 3,755,075
[45] Aug. 28, 1973

[54] CONDENSER-TYPE GAS COMBINER

[75] Inventor: James O. Henrie, Hidden Hills, Calif.

[73] Assignee: North American Rockwell Corporation, El Segundo, Calif.

[22] Filed: Mar. 25, 1970

[21] Appl. No.: 22,633

[52] U.S. Cl............ 176/37, 176/38, 423/580, 176/55
[51] Int. Cl.............................................. B01j 9/02
[58] Field of Search............... 176/37, 38, 39, 54, 176/55, 56; 23/288 R; 423/580, 659

[56] References Cited
UNITED STATES PATENTS

| | | | |
|---|---|---|---|
| 2,879,146 | 3/1959 | McElroy et al. | 23/288 R |
| 2,943,921 | 7/1960 | King | 23/288 R |
| 3,028,327 | 4/1962 | Weeks | 176/37 |
| 3,068,164 | 12/1962 | Coles et al. | 23/288 R |
| 3,098,810 | 7/1963 | McElroy et al. | 176/39 |

FOREIGN PATENTS OR APPLICATIONS

| | | | |
|---|---|---|---|
| 592,766 | 2/1960 | Canada | 176/37 |

Primary Examiner—Carl D. Quarforth
Assistant Examiner—E. E. Lehmann
Attorney—L. Lee Humphries, Thomas S. MacDonald and Robert M. Davidson

[57] ABSTRACT

A condenser-type gas combiner, intended primarily for use with nuclear reactors, wherein hydrogen and oxygen are recombined at low pressures using a condenser as a driving force to transport the hydrogen and oxygen gases through a catalytic bed.

8 Claims, 4 Drawing Figures

Patented Aug. 28, 1973

INVENTOR.
JAMES O. HENRIE

BY Robert M. Davidson

ATTORNEY

INVENTOR.
JAMES O. HENRIE
BY Robert M. Davidson
ATTORNEY

CONDENSER-TYPE GAS COMBINER

BACKGROUND OF THE INVENTION

1. Field of the Invention

This invention relates to a system for combining hydrogen and oxygen gases. More particularly, the invention relates to a novel system whereby hydrogen and oxygen are combined at low pressures using a condenser to supply the pressure differential necessary to transport the gases through a catalytic bed. Still further, the invention relates to a system for recombining hydrogen and oxygen resulting from the radiolytic decomposition of water in nuclear reactors.

In the operation of a homogeneous solution type nuclear reactor, hereinafter referred as a water-boiler reactor, water is radiolytically decomposed into hydrogen and oxygen gases. The recombination of the released hydrogen and oxygen gases is vital to the operation of the reactor; otherwise, the gases would have to be vented, fission products would not be well contained, and a water makeup system would be required.

Similarly, in the operation of a boiling-water power reactor a certain amount of water surrounding the fuel elements is radiolytically decomposed into hydrogen and oxygen. From there it is transported, along with the pressurized steam produced in the reactor core, through the power turbine and into the condenser. The gases which are not condensed in the condenser must be pumped from the system. These gases contain radioactive material which has caused significant public concern when dumped into the atmosphere. To remove the radioactive materials from these gases, it is considered essential to first recombine the hydrogen and oxygen content of the gases, which constitutes about 90 percent of the non-condensables, thereby eliminating potential explosive mixtures and reducing the volume of gas to be treated.

Since in the operation of nuclear reactors hydrogen and oxygen are formed from the radiolytic decomposition of water, systems designed to combine these gases are called recombiners.

2. Description of the Prior Art

Previous types of gas recombiners can be classified as of the convection, duffusion, or forced-flow types. The convention type of recombiner relies upon natural convection currents within the hot gases to create a flow of gas across the surface of a catalyst where the recombination occurs. An example of this type of recombiner is illustrated by U.S. Pat. No. 2,847,284 issued Aug. 12, 1958 to Busey. In the diffusion recombiner, the gases diffused randomly from their source to the surface of the catalyst in the recombiner. U.S. Pat. No. 3,098,810 issued July 23, 1963 to McElroy et al. is an example of a diffusion type gas recombiner. A forced-flow recombiner system utilizes a blower (pump) to force the gases past the surface of a catalyst. An example of this type recombiner is illustrated by U.S. Pat. No. 2,879,146 issued Mar. 24, 1959 to McElroy et al.

In practice each of the recombiners discussed above has encountered limitation on its utility. The convection and diffusion types are relatively large in size and small in capacity. Consequently their use is limited to small waterboiler reactors, with their low capacity limiting reactor power.

The forced-flow systems have essentially unlimited capacity but require the use of gas pumping systems as well as the introduction of a carrier gas. The carrier gas is required to dilute the hydrogen and oxygen mixtures and thereby prevent explosive reactions. The added complexity of such a system for water-boiler reactors is very undesirable, especially where a completely closed system is preferred. If the recombiner is designed for use after the steam condenser in a boiling-water power reactor cycle, the use of a non-condensable diluent such as nitrogen or air is self-defeating, in that it greatly increases the gas volume making it more difficult and expensive to remove the radioactive materials. The non-condensable gas volume can be reduced using steam as the diluent, but producing and condensing the large quantities of steam required to safely dilute the hydrogen and oxygen gases is very expensive.

The limitations of the prior art recombiners give rise to a critical need for an improved form of gas recombiner for use with nuclear reactors experiencing radiolytic decomposition of water.

SUMMARY OF THE INVENTION

The present invention provides means for combining hydrogen and oxygen gases, as for example those which are radiolytically produced in nuclear reactor cores, simply and efficiently without the limitations connected with prior art devices. This desirable result is achieved through the use of a condenser-combiner combination wherein gases are drawn through a catalyst bed due to a reduced pressure caused by the condensation of those gases on the downstream side of the catalyst bed.

Accordingly, the objects of the present invention are:

to provide an improved gas combiner, to provide an improved gas recombiner for nuclear reactors, to provide an improved explosion proof gas recombiner for nuclear reactors, to provide an improved condenser-type gas recombiner for water-boiler reactors, to provide an improved condenser-type recombiner for boiling-water reactors, and to provide an improved condenser-type gas recombiner for nuclear reactors that is capable of high throughput without the necessity of forced flow or the introduction of a carrier gas.

Reference to the above drawings will be made in the following detailed description of the preferred embodiments of the invention.

DETAILED DESCRIPTION OF THE PREFERRED EMBODIMENTS

I have found that an improved form of catalytic gas combiner for the combination of hydrogen and oxygen gases can be safely operated by forcing the gases at low pressure through a catalyst bed to a condenser. The driving force of the process is the difference in vapor pressure across the catalyst bed due to the condensation on the downstream side. The low pressure avoids the possibility of an explosive reaction, having the same effect as adding a diluent. Experiments have shown that even a stoichiometric mixture of hydrogen and oxygen gases at room temperature will not explode in the presence of a glowing filament if the pressure is below about 40 centimeters of mercury; furthermore, a flame cannot be sustained in the mixture if the pressure is below about 7.5 centimeters of mercury. Also, the addition of water vapor increases the minimum pressure necessary to sustain an explosion.

Figure 1:
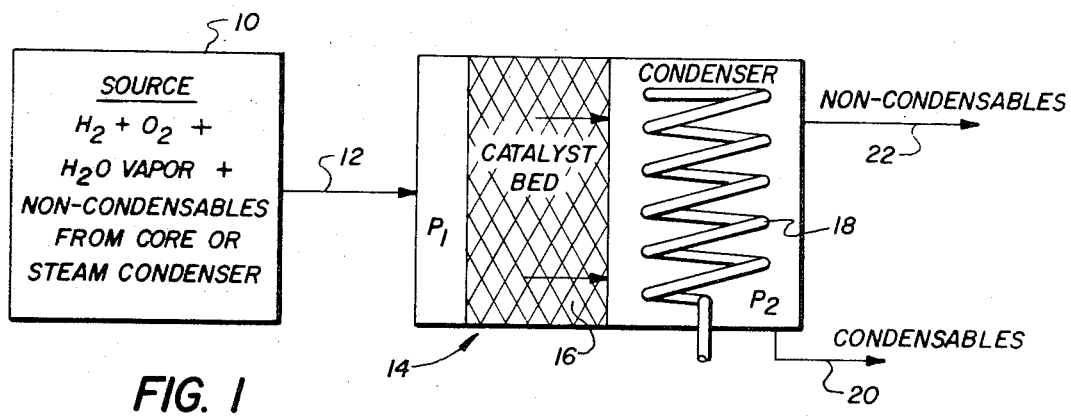
FIG. 1 is a schematic drawing illustrating the flow of gases through the recombiner.

FIG. 1 illustrates the novel gas recombiner system of this invention. In that figure, 10 represents a source of water vapor, hydrogen, oxygen and other non-condensables. As an example, this source could be the core of a water-boiler reactor, or it could be the off gas of the condenser of a boiling-water power reactor cycle. In any event, the gases are supplied to a catalyst-condenser zone, 14, by line 12. The gases are passed through catalyst 16 where the hydrogen and oxygen react to form water vapor. After the gases pass through the catalyst bed, water vapor is condensed by the condenser 18. The condensed water leaves via line 20 and the non-condensable gases are withdrawn via line 22. The condensation of water vapor by condenser 18 causes pressure $P_2$ downstream of the catalyst to be lower than pressure $P_1$, upstream from the catalyst to the extent that the gases are forced through the catalyst without any need for pumps or blowers, except for the pump which removes the non-recombinable non-condensable gases and those condensable gases not condensed. In water-boiler reactors, the quantity of these gases is so low that they do not require removal during the life of the reactor and these systems operate on a closed cycle basis and essentially all the water vapor is condensed.

Figure 2:
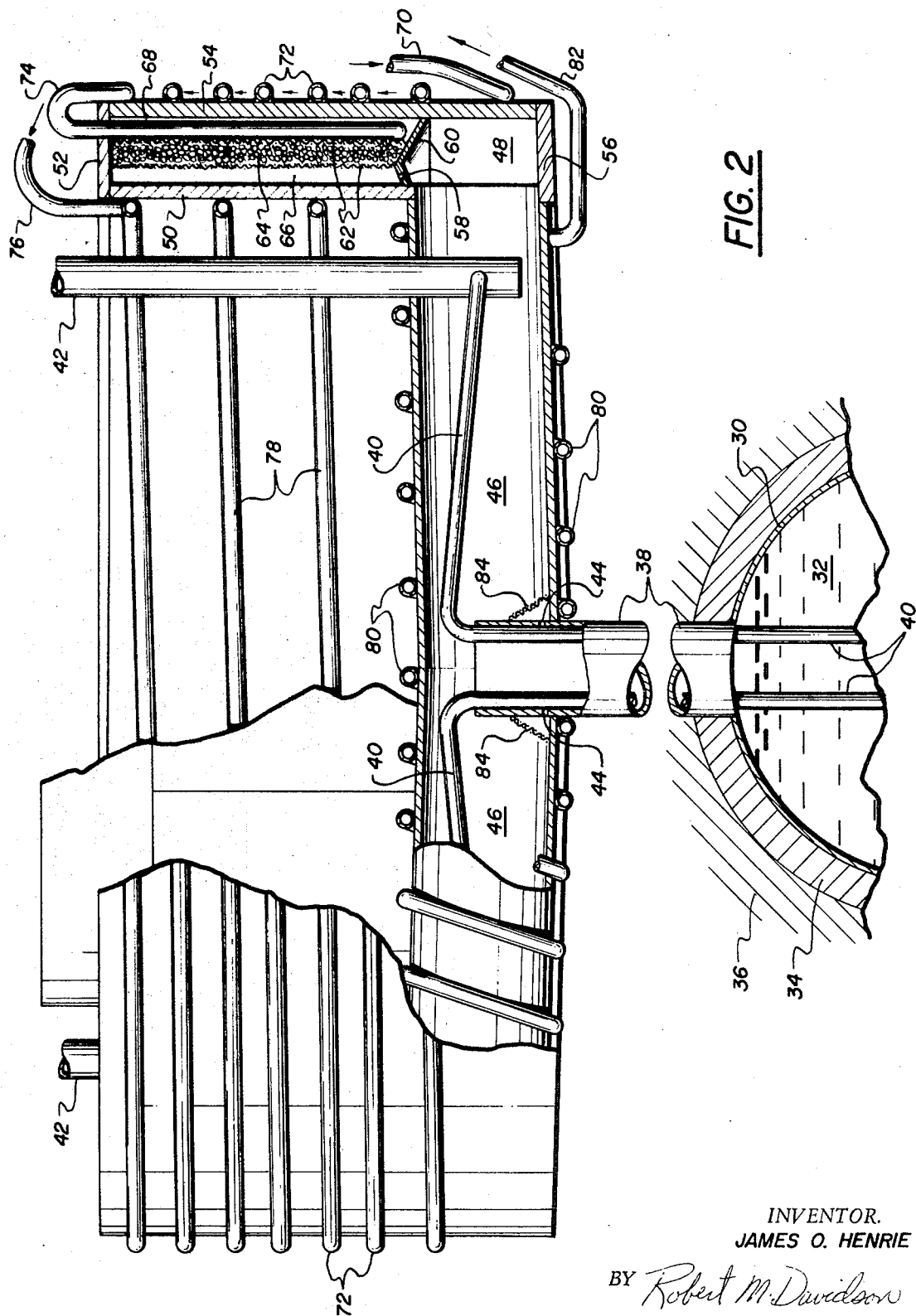
FIG. 2 is a vertical sectional view of a water-boiler reactor with its condenser-type gas recombiner.

A more detailed description of a condenser-type gas recombiner for use with water-boiler reactors is illustrated in FIG. 2. In that figure, 30 represents a reactor vessel containing a homogeneous solution 32 of a uranium salt which acts s a fuel. A layer of reflector material 34, such as beryllium, substantially surrounds the reactor vessel 30. Graphite 36 surrounds the entire reactor vessel 30 and reflector layer 34. A pipe 38 extends upwardly from the vessel 30 through reflector material 34 and graphite 36. The upper end of pipe 38 is in fluid communication with the condenser-type gas recombiner. Pipe 38 serves three primary functions. It contains cooling tubes 40 which operate to withdraw heat from core 32. The cooling tubes are in fluid communication with header pipes 42 which circulate the cooling water outside the reactor. The second function of pipe 38 is to provide communication betwween core 32 and the condenser-recombiner for radiolytically formed hydrogen and oxygen. A third function is to provide for return of recombined and condensed water to the reactor core. Water return is provided by small drain holes 44. The upper end of pipe 38, including drain holes 44 is positioned within the condenser-recombiner.

Generally, the condenser-recombiner consists of a substantially horizontally positioned duct 46 which is in direct communication with and into which extends pipe 38. Duct 46 is canted or sloped toward pipe 38 for reasons explained herein below. The outer ends of duct 46 are attached to and in fluid communication with an annular chamber 48 which is formed by inner wall seciton 50, upper wall section 52, outer wall section 54 and lower wall section 56. As shown, lower wall section 56 is flush with the lower portion of duct 46. A two-section barrier which traverses chamber 48 is positioned between inner wall section 50 and outer wall section 54. Inner section 58 of this barrier slopes upwardly away from inner wall section 50, and is liquid and gas permeable. A secton portion 60 of the barrier slopes upwardly away from outer wall section 54 and is relatively liquid and gas impermeable. Resting between section 60 and upper chamber wall section 52 are catalyst holder screens 62, between which is placed catalyst material 64. The placement of screens 62 and catalyst material 64 leaves a chamber 66 for gas entry and a chamber 68 which is the condenser section of the recombiner.

In order to provide heat removal for condensation and for removal of the heat of reaction, a system of cooling tubes is positioned in and around the condenser-type recombiner. As shown in FIG. 2, cooling water enters tube section 70 and then passes through helical wrapping 72 through section 74 and into condenser section 68. In the condenser section, the tube is wrapped in an up-and-down fashion all the way around the apparatus. Then, the tubing runs upwardly out of section 68 forming neck portion 76 and helical wrapping 78 which are adjusted to wall portion 50. From there, the tubing forms a helical wrapping 80 around duct 46 and then exits at 82. It will be noted that the flow of cooling water is generally countercurrent to the flow of gases within the condenser-recombiner. This is the preferred direction of flow. However, the particular arrangement of cooling tubes is not critical to the operation of the invention.

In operation, hydrogen and oxygen which are radiolytically formed in the core region 32 flow upwardly through pipe 38 into duct 46. From there the gases pass outwardly into chamber 48 where they flow in a circular pattern around that annular chamber. The gases pass through permeable section 58 into zone 66 where they flow through the screen 62 and contact catalyst material 64. On contact with the catalyst, the hydrogen and oxygen are recombined into water vapor. This water vapor enters condenser 68 where it is condensed by the cooling coils. The condenser water collects on barrier section 60. In one embodiment, this water is caused to flow down wall section 54 due to an imperfect seal at the intersection of barrier section 60 and the outer wall section 54. Flow of gases through such an imperfect seal is reduced by first of all the easy access of zone 66 through porous section 58, and secondly, by the pressure due to the water buildup on section 60. Actually, the pressure drop required across the catalyst, i.e., between zones 66 and 68, is very small. Usually, the system will be operated at a pressure drop of less than one centimeter water. Hence the accumulation of a small amount of water on section 60 will serve as a gas seal. Alternatively, section 60 can be tightly sealed to outer wall 54 and there can be positioned along section 60 at one or more locations a gas trap, not shown, of conventional design which would allow for the buildup and drainage of accumulated water through section 60.

Water drained from the condenser area falls to lower section 56 and is carried down the canted or sloped duct 46 to drain holes 44, and then down pipe 38 for return to the core area 32. A screen 84 covering holes 44 is provided within duct 46 for the purpose of preventing any solids, such as catalyst particles, from entering the core region of the reactor.

Boiling-water reactors also incur radiolytic water decomposition within the core. The design of a gas recombiner for a boiling-water reactor must take into account the function of this type of reactor which is to provide steam for electric power production. Whereas in the water-boiler reactor, the gas recombiner is in direct communication with the core, in the boiling-water reactor the steam quantities are so great that such an arrangement is not feasible.

The hydrogen and oxygen formed in the core region constitute about 15 to 30 parts per million by weight. Relatively small amounts of radioactive non-condensable materials are also present in the gas. All of these gases are carried with the steam through the steam turbines, where air is added due to inleakage through bearings, and into large steam condensers which convert most of the remaining steam to water for return to the reactor. The off gases from the condenser therefore consist of hydrogen, oxygen, water vapor, air and non-condensable radioactive matter.

In the past, it has been a common practice to dilute this mixture and vent it directly into the atmosphere. In some power plants, the amount of radioactivity in the vented gas stream is substantial, amounting to as much as 5–10 millicuries per second. Efficient removal of radioactive material from these gases first requires the recombination of hydrogen and oxygen to prevent explosions and to reduce volume.

Figure 3:
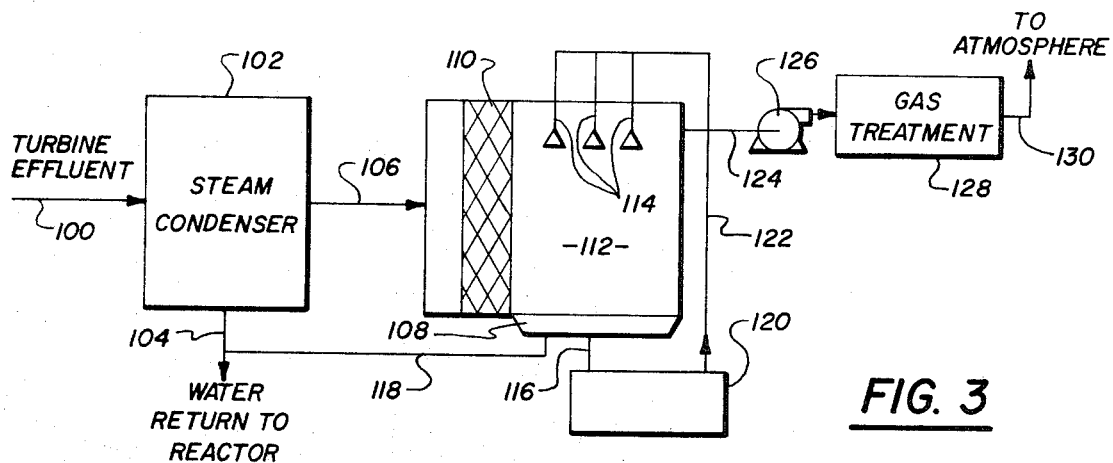
FIG. 3 is a schematic diagram of a preferred embodiment of the recombiner for use with large boiling-water reactors.

FIG. 3 illustrates a first preferred embodiment of the condenser-recombiner for use with boiling-water reactors. In this figure, 100 represents the exhaust from a power turbine of a boiling-water reactor power cycle.

It is the normal practice to condense substantially all the steam in a steam condenser 102. The condensate water 104 is recycled to the reactor and the non-condensable gases 106 are ejected from the condenser. In FIG. 3 these gases form the input to a condenser-type recombiner 108. Upon entering the recombiner the gases are drawn through a catalyst bed 110. During contact with the catalyst at 110, the hydrogen and oxygen portions of the input gases react exothermically to form water vapor. The gases leaving bed 110 enter the condenser section 112 of the condenser-recombiner. Here, water vapor formed during the recombination reaction is condensed by direct spray condensers 114. The resulting water 116 is withdrawn from the condenser and sent to a water cooler 120. Cooled water 122 leaving cooler 120 is recycled to condensers 114. The excess, or overflow water resulting from steam condensation is returned to the reactor through 118.

Remaining gases 124 which are not condensed are withdrawn by a pump 126, which will normally be of the steam jet air ejector type to a gas treatment zone 128 where the gases are filtered, adsorbed, or otherwise treated to remove a portion or all of the radioactive material contained therein. The treated and cleaned gases 130 are then vented to the atmosphere.

Figure 4:
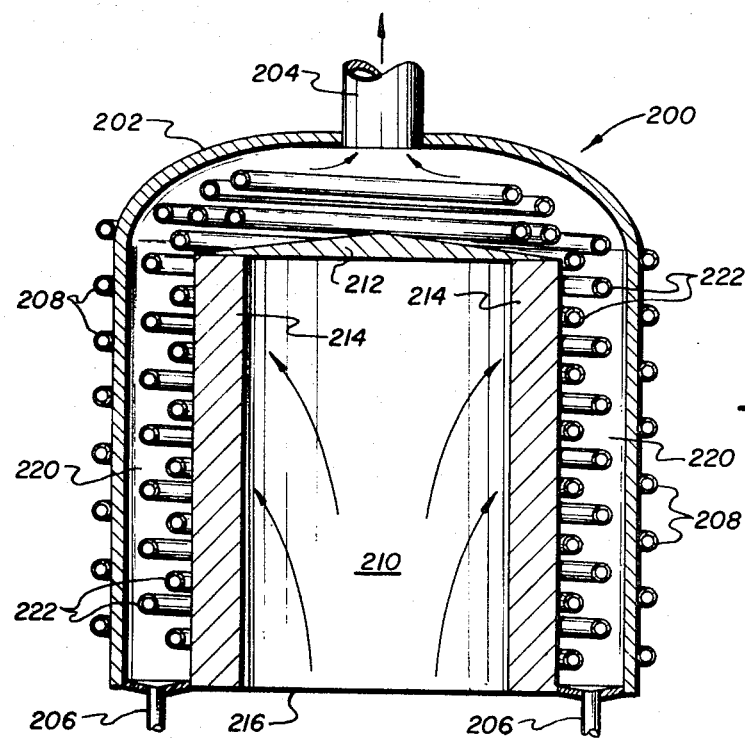
FIG. 4 is an enlarged vertical sectional diagram illustrating a second preferred embodiment of the recombiner for use with boiling-water reactors.

FIG. 4 illustrates a second preferred embodiment of the invention for use with boiling-water reactor power cycles. In that figure, 200 represents the combination condenser-recombiner. The condenser-recombiner consists of an outer chamber 202 having associated therewith vent 204 and drainlines 206. Condenser cooling tubes 208 are wrapped around condenser 202. Within chamber 202 is an internal chamber 210 defined by upper portion 212, porous catalyst bed 214, and inlet 216. Outside of catalyst bed 214 and within chamber 202 is condenser area 220 containing condenser tubes 222.

In operation, the gaseous effluent from the condenser section of a boiling-water reactor power cycle enters the condenser-recombiner through inlet 216 and passes into internal chamber 210. A pressure difference existing between internal chamber 210 and recombiner condenser area 220 of outer chamber 202 forces the gases to pass through the porous catalyst walls 214. During contact with the catalyst the hydrogen and oxygen recombine to form water vapor in an exothermic reaction. After passage through catalyst 214 the gases enter the recombiner condenser area 220 and are cooled and condensed by contact with cooling tubes 222 and the wall portion of outer chamber 202, cooled by tubes 208. The condensed water is drawn off via lines 206 and the remaining gases are ejected through vent 204. These gases then may be further condensed and sent to a gas treatment zone to reduce the amount of radioactive material entering the atmosphere.

The difference in pressure between chamber 210 and the condenser area 220 is due to the condensation of gases in area 220 and the low pressure removal of the non-condensables.

The condenser-type recombiner systems and apparatuses described above can be operated under a variety of conditions. The catalyst bed may assume any number of common designs of porous beds such as pills, pellets, or spheres arranged in cylindrical or sheet-type arrays. Still further, catalytically coated wires, foils, tapes or tubes may be used. The composition of the catalyst is not critical to the process. Any number of known catalysts for the reaction: $2H_2 + O_2 \rightarrow 2H_2O$ may be used. A preferred catalyst is platinum coated alumina pellets. Intake pressures will vary depending upon the source, but in general the intake pressure will be less than atmospheric. In water-boiler reactors it is expected that the intake pressure will normally be in the range of from about 2–50 cm of mercury whereas in embodiments designed to operate from the exhaust of a main condenser in a boiling-water reactor power cycle, the intake pressure will almost always range below about 10 cm of mercury. These pressure ranges represent preferred operating conditions. Actually, the only limits upon intake pressure are the ability to maintain a lower pressure downstream of the catalyst on the one hand, and the explosive threshold on the other hand. The latter limit will or course vary depending upon the amounts of gases other than hydrogen and oxygen, such as water vapor present in the intake mixture. The minimum driving pressure, i.e., the pressure drop caused by the catalyst bed, will depend upon the design of particular catalyst beds. However, this pressure drop will normally be very small amounting to less than a cm or so of mercury. Temperatures within the catalyst bed may vary over a very wide range from room temperature or below to the catalyst decomposition temperature. Heat formed by the exothermic reaction is removed from the catalyst by the gas stream flowing through the bed. The temperature rise of the gas is dependent upon its constituents and flow rate, which are functions of the non-condensable gas flow rate, the vapor pressure of the mixture entering the condenser-recombiner, and the pressure of the gases leaving the condenser-recombiner. The extent of water vapor condensation occuring in the condenser portion of this invention will vary depending upon the use of the invention and upon the economic conditions prevailing at the time. In use with water-boiler reactors where closed cycle operation is normally desired essentially all the water vapor will be condensed. In the case of boiling-water reactors it is foreseen that less than 100 percent of the water vapor may be condensed, in fact, in some instances the condensate may amount to only a small fraction of the water vapor formed. In all cases, however, the application of this invention involves the condensation downstream of the catalyst of at least a portion of the water vapor formed by the combination of the hydrogen and oxygen gases.

For example, if at a particular time the pressure in a steam turbine condenser of a boiling-water reactor power cycle is 1.500 inches (3.810 cm) of mercury, and the water vapor temperature is at 90°F (32.2°C), corresponding to a partial pressure of the water vapor of 1.421 inches (3.609 cm) of mercury, the partial pressure of the non-condensables would be 0.079 inches (0.201 cm) of mercury. The mixture would be 5.3 percent non-condensable and 94.7 percent water vapor on a volume basis. Typical gas flowrates entering the condenser-recombiner for a 1.000 mwe boiling-water reactor power plant are: 370 cfm (10.36 M³/m [meters cubed per minute]) of air, 1480 cfm (13.44 M³/m) of oxygen, and 2970 cfm (83.16 M³/m) of hydrogen, totalling 4800 cfm (134.4 M³/m), at 90°F (32.2°C) and 1.5 inches (3.81 cm) of mercury. The total flow, including water vapor would then be 4800 cfm (134.4 M³/m)/.053 = 90,000 cfm (2549.0 M³/m). As this gas passes through the catalyst its temperature rises from 90°F (32.2°C) to approximately 520°F (271°C). The pressure drop across a 1-inch (2.54 cm) catalyst bed has been calculated to be below 0.20 inches (0.51cm) of mercury. This results in a required pressure of 1.30 inches (3.30 cm) or less of mercury just downstream from the catalyst bed. Assuming that essentially all of the hydrogen and oxygen are recombined, and that the gases leaving the condenser-recombiner are at a ratio of 18 to 1, water vapor to air, the water vapor pressure is 18/19 × 1.30 = 1.23 inches (3.12 cm) of mercury. This corresponds to a vapor temperature of 86°F (30.0°C), just 4°F (2.2°C) lower than the main condenser temperature. Under these conditions, total gas flow leaving the condenser-recombiner is 19 × 370 = 7000 cfm (198.2 M³/m), which is only 7/90 =8 percent of the orignally assumed flow and is 95 percent water vapor. Pumping costs are therefore greatly reduced. After pumping these gases from the system and increasing their pressure to atmospheric, essentially all of the water vapor can be condensed out, leaving about 20 cfm (0.566 M³/m) of non-condensables. These gases can be readily filtered and safely passed through absorbing beds to remove most of the harmful radioactive materials.

The control of a condenser-type recombiner as, for example, one according to the present invention, is easily achieved since the water cooling the main turbine condenser and the water cooling the recombiner-condenser (or cooling the water which is sprayed into the recombiner-condenser) could come from the same source and hence would always have comparable inlet temperatures, day or night, summer or winter. By design and initial adjustment, the recombiner-condenser temperature could be set and would self-regulate to 4°F (2.2°C) or so below the main turbine steam condenser temperature. The recombiner-condenser therefore acts as a regulated pump on the main turbine condenser and assures proper flow to the recombiner even with changing coolant water temperature.

As the electrical demand fluctuates, the amount of steam entering the turbine condenser changes, varying condenser temperatures and pressures. However, the amount of hydrogen and oxygen gases being produced also fluctuate with reactor power, changing the load on the recombiner-condenser proportionately to the load change on the main turbine condenser. Therefore, power changes would not upset the balance between the two condensers.

A change in the relationship between the pressure maintained by the pump (or ejector) and the water vapor pressure in the recombiner-condenser changes the ratio of water vapor to non-condensables entering the pump. This pressure change is further reflected back to the main turbine condenser, changing the ratio of water vapor to non-condensables entering the catalyst bed. Lowering the pump pressure relative to the main turbine condenser water vapor pressure increases the ratio of water vapor to non-condensables entering the catalyst bed and causes the catalyst bed to operate at a lower temperature. Increasing the pump pressure relative to the condenser water vapor pressure has the opposite effect and catalyst bed temperatures would rise. A partially self-compensating factor in this area is that increases in pump pressure also increase the quantity of non-condensables residing in the condenser, thus decreasing condenser efficiency and raising the vapor pressure, thereby tending to reduce the relative pressure change.

It is seen from the above disclosure of the preferred embodiments of the invention that the type of gas recombiner disclosed herein provides a simple, efficient and easily controllable device for recombining hydrogen and oxygen resulting from a radiolytic decomposition within nuclear reactors.

Although particular embodiments of this invention have been described it should be understood that various other modifications and adaptations thereof may be made by those skilled in this particular art without departing from the spirit and scope of this invention as set forth in the following claims.

I claim:

1. A system for combining hydrogen and oxygen comprising:
    a. a first zone containing hydrogen and oxygen gases, said first zone being maintained at a pressure below atmospheric pressure,
    b. a second downstream zone separate and discrete from said first zone, said second zone containing means for condensing water vapor, said second zone having a pressure less than the pressure in said first zone, and
    c. catalyst means for effecting the reaction:

positioned in flow communication between said first and second zones such that said catalyst means provides the sole means for gaseous communication and flow between said first and second zones, the lowering of pressure by condensation of water vapor in said second zone being the driving force to cause flow of said gases into said catalyst means and flow of recombined gas vapor into said second zone.

2. The system of claim 1 wherein said hydrogen and oxygen are products of the radiolytic decomposition of water.

3. In a "water-boiler" nuclear reactor wherein during operation water is radiolytically decomposed in the core region thereby forming hydrogen and oxygen, and wherein said reactor has associated therewith a catalytic gas recombiner operable to recombine said hydrogen and oxygen into water for return to the core region, the improvement comprising a catalytic gas recombiner having
   a. a first zone containing hydrogen and oxygen gases, said first zone being maintained at a pressure below atmospheric pressure,
   b. a second downstream zone separate and discrete from said first zone, said second zone containing means for condensing water vapor, said second zone having a pressure less than the pressure in said first zone, and
   c. catalyst means for effecting the reaction:

$$2H_2 + O_2 \rightarrow 2H_2O$$

positioned in flow communication between said first and second zones such that said catalyst means provides the sole means for gaseous communications and flow between said first and second zones, the lowering of pressure by condensation of water vapor in said second zone being the driving force to cause flow of said gases into said catalyst means and flow of recombined gas vapor into said second zone.

4. The "water-boiler" reactor of claim 3 wherein said first zone has a pressure of from about 2 to about 50 cm of mercury.

5. In a nuclear power plant containing a "boiling water" nuclear reactor wherein high pressure steam is generated, a turbine powered by said high pressure steam, and a condenser to convert exhaust turbine steam into water for return to said reactor, and wherein hydrogen and oxygen are radiolytically formed within said reactor and are carried with said steam through the turbine and into said condenser and are passed from said condenser in the gaseous phase, the improvement comprising a catalytic gas recombiner operable to recombine said hydrogen and oxygen into water, said recombiner having
   a. a first zone containing hydrogen and oxygen gases, said first zone being maintained at a pressure below atmospheric pressure,
   b. a second downstream zone separate and discrete from said first zone, said second zone containing means for condensing water vapor, said second zone having a pressure less than the pressure in said first zone, and
   c. catalyst means for effecting the reaction:

$$2H_2 + O_2 \rightarrow 2H_2O$$

positioned in flow communication between said first and second zones such that said catalyst means provides the sole means for gaseous communications and flow between said first and second zones, the lowering of pressure by condensation of water vapor in said second zone being the driving force to cause flow of said gases into said catalyst means and flow of recombined gas vapor into said second zone.

6. The power plant of claim 5 wherein said first zone has a pressure of less than about 10 cm of mercury.

7. The power plant of claim 6 wherein said condensing means comprises an indirect heat exchanger.

8. The power plant of claim 6 wherein said condensing means comprises a direct heat exchanger, and wherein water is used as the heat exchange medium.

* * * * *